United States Patent [19]
Leonida et al.

[11] Patent Number: 5,324,565
[45] Date of Patent: Jun. 28, 1994

[54] CONDUCTIVE ELASTOMERIC COMPRESSION PAD FOR USE IN ELECTROLYSIS CELLS

[75] Inventors: Andrei Leonida, West Hartford; Lawrence C. Moulthrop, Windsor, both of Conn.

[73] Assignee: United Technologies Corporation, Windsor Locks, Conn.

[21] Appl. No.: 991,905

[22] Filed: Dec. 17, 1992

[51] Int. Cl.⁵ .................... H01M 2/00; B32B 3/10
[52] U.S. Cl. .................... 428/131; 428/195; 428/209; 428/323; 428/328; 428/457; 428/312.8; 428/206; 429/66; 429/30; 429/34; 204/252; 204/296; 204/279
[58] Field of Search ............... 428/131, 195, 209, 323, 428/328, 457, 312.8, 206; 204/252, 296, 279; 429/66, 30, 34

[56] References Cited

U.S. PATENT DOCUMENTS

| | | | |
|---|---|---|---|
| 4,371,433 | 2/1983 | Balko et al. | 204/279 |
| 4,445,026 | 4/1984 | Walker | 252/511 |
| 5,030,524 | 7/1991 | Stadnick et al. | 429/66 |

FOREIGN PATENT DOCUMENTS 2554402  10/1976  Fed. Rep. of Germany ........ 429/66

*Primary Examiner*—William Watkins, III
*Attorney, Agent, or Firm*—Pamela J. Curbelo

[57] ABSTRACT

Accumulated dimensional variations in fuel cells and electrolysis cell assemblies can reduce the efficiency of the assembly and provide leakage paths for fuel and oxidant. An elastomeric compression pad comprised of an oil adsorbent sheet surrounding an elastomeric material with expansion pathways and electrical pathways, that utilize a conductive powder and elastomeric binder compensates for component dimensional variations, improves inter-cell conductivity, and allows high pressure operation up to about 3,000 psig.

14 Claims, 4 Drawing Sheets

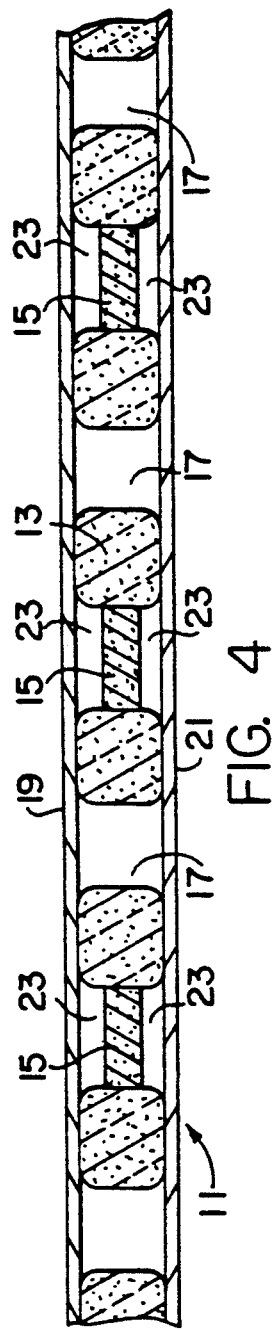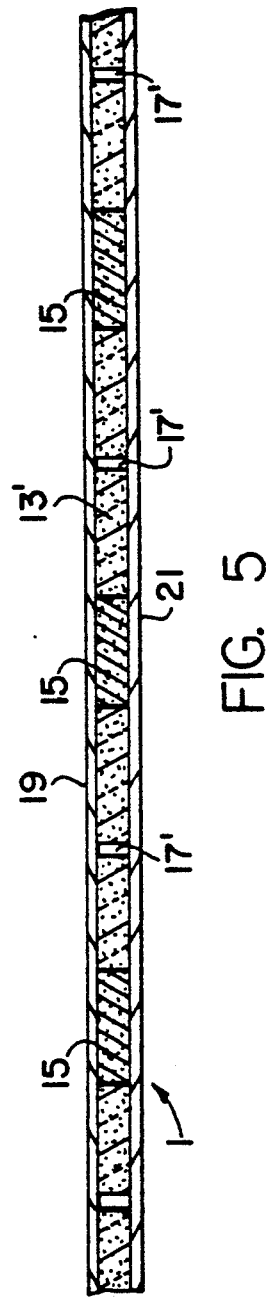
FIG. 4
FIG. 5

CONDUCTIVE ELASTOMERIC COMPRESSION PAD FOR USE IN ELECTROLYSIS CELLS

CROSS REFERENCE TO RELATED APPLICATION

Reference is hereby made to commonly owned U.S. U.S. Ser. No. 07/991,906 which discloses subject matter related to the subject matter of the present application.

TECHNICAL FIELD

The present invention relates to a compression pad for compensating for component dimensional variations within a system and especially relates to an elastomeric compression pad for compensating for component dimensional variations within a cell.

BACKGROUND OF THE INVENTION

An electrolysis cell is a mechanical assembly for electrolyzing water to hydrogen and oxygen gas. To meet hydrogen and oxygen production requirements, a plurality of electrolysis cells are often assembled in a single module or stack. FIG. 1 illustrates a bi-polar electrolysis cell stack where a plurality of electrolysis cells, cell 1, cell 2, and cell 3, are stacked and electrically connected in series. The major cell stack components are, sequentially: anode electrode 5, solid polymer electrolyte 7, cathode electrode 3, and cathode and anode chambers located in the frames 10 which surround the components. All of these components are thin, flat and rigid, with the anode electrodes 5 and cathode electrodes 3 having an active area of catalyst, 4 and 2 respectively, in contact with the electrolyte. In order to ensure optimum decomposition of the water to hydrogen ions and oxygen, formation of molecular oxygen, and conversion of the hydrogen ions to molecular hydrogen, uniform current distribution across the active areas of catalyst is required. Uniform current distribution requires uniform contact pressure over these active areas.

However, uniform contact pressure over the active areas of the anode and cathode electrodes is seldom attained solely through design since each component's dimensions vary within some specified limits due to individual component fabrication by various production methods. Standard electrolysis cells often show compounded component dimensional variations of about 0.007 to about 0.010 inches due to fabrication limitations, with additional dimensional variations of up to about 0.002 inches/inch due to differential thermal expansion during electrolysis cell operation.

An elastic component, known as a compression pad 9, is included in electrolysis cell stacks in order to attain the electrolysis cell stack requirements of uniform contact pressure over the active area of the anode and cathode electrodes, sufficient contact pressure to prevent movement of the electrolyte which causes degradation thereof, and fluid tight seals to prevent mixing of the product gases which can cause an explosion. To date, this compression pad 9 compensates for dimensional variations to maintain uniform contact over the active areas up to pressures of about 500 psig for an electrically conductive compression pad, and up to pressures of about 900 psig for an electrically nonconductive compression pad.

Although the compression pad can compensate for dimensional variations at pressures up to about 900 psig, more and more applications require increased gas delivery pressure capabilities, many beyond the capability of prior art compression pads. Increased pressure requirements were initially addressed by enclosing the entire cell stack within a pressure vessel to limit the maximum load across the compression pad to about 200 psig. In this configuration, the compression pad was vented to the vessel and the stack was operated in a balanced pressure mode, i.e. both gases were produced at approximately the same pressure of up to about 6,000 psig. The vessel plus the pressure controls associated with this configuration, however, added significant weight and expense to the system.

Electrolysis cell stacks without a pressure vessel are simpler, lighter, and less expensive than those requiring pressure vessels. In this configuration, the compression pad is totally sealed, i.e. not externally vented, and must withstand significantly higher pressure differentials, approximately equal to the sum of the highest internal pressure during operation (up to about 1,000 psig) and the compression required to maintain uniform electrical contact. This differential pressure can attain about 1,500 psig while the compression pad 9 can only effectively compensate for dimensional variations up to about 900 psig. Therefore, at high pressures, exceeding about 900 psig, the traditional material and design are only marginally useful as a compression pad.

What is needed in the art is a high pressure compatible, electrically conductive compression pad useful in maintaining uniform contact at pressure differentials up to about 3,000 psig.

DISCLOSURE OF THE INVENTION

The present invention relates to an elastomeric compression pad for compensating for component dimensional variations. This compression pad comprises an elastomeric material having an overall uncompressed length and a width, with a plurality of expansion pathways located across the width of said elastomeric material. These expansion pathways have sufficient volume to allow the elastomeric material to substantially maintain its overall uncompressed length while in a compressed state. The elastomeric material further has a plurality of electrical pathways containing a sufficient amount of conductive substance to form an electrically conductive path across the width of the elastomeric material.

The present invention also relates to an improved electrolysis cell for operating at pressures up to about 3,000 psig. The electrolysis cell comprises an anode electrode, a cathode electrode, and an electrolyte disposed therebetween while the improvement is the elastomeric compression pad.

The foregoing and other features and advantages of the present invention will become more apparent from the following description and accompanying drawings.

BRIEF DESCRIPTION OF THE DRAWINGS

FIG. 4 is a cross-sectional view of the uncompressed elastomeric compression pad of FIG. 3.

FIG. 5 is a cross-sectional view of the compressed elastomeric compression pad of FIG. 3.

BEST MODE FOR CARRYING OUT THE INVENTION

Figure 2:
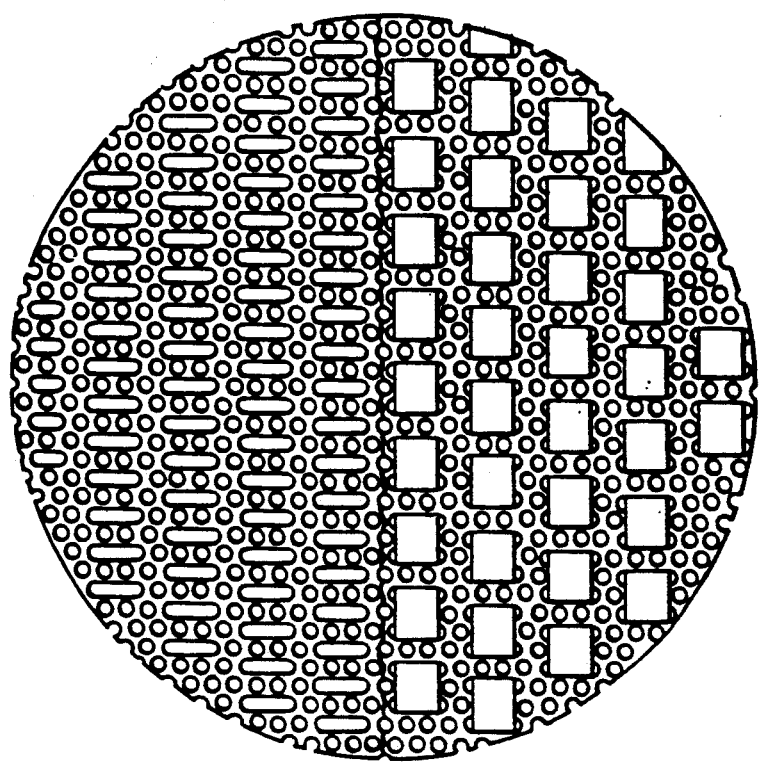
FIG. 2 is an embodiment of the prior art compression pad.
Figure 1:
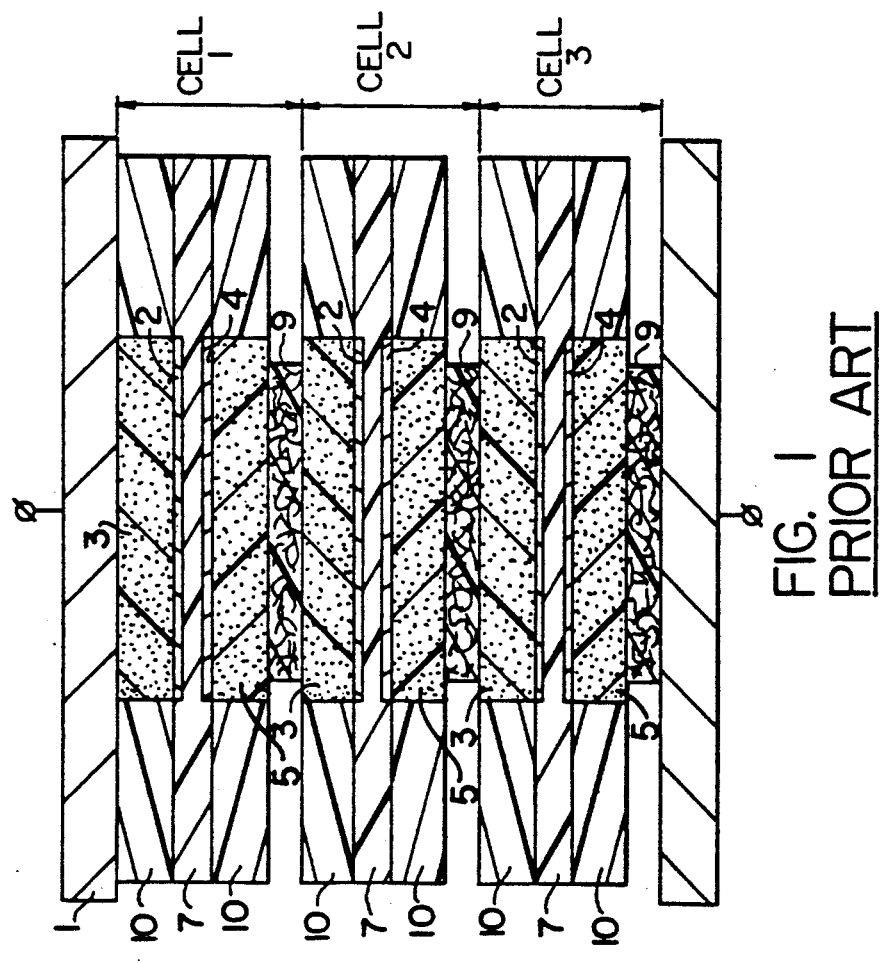
FIG. 1 an illustration of a bi-polar electrolysis cell stack.

The compression pad of the present invention compensates for dimensional variations in the components of a fuel cell, electrolysis cell, or cell stack thereof (hereinafter referred to as cell) to maintain uniform contact pressure over the active areas of the electrodes in the cell over the entire range of operating conditions up to about 3,000 psi without the use of a pressure vessel. The compression pad is comprised of an elastomeric material having an electrically conductive substance for establishing an electrical path through the elastomeric material and a means for compensating for lateral expansion and for supporting the conductive substance.

The elastomeric material is selected based upon the operating conditions of the cell. These operating conditions may include pressure and temperature, as well as the thickness and deformation of the compression pad during use. Since the compression pad and therefore the elastomeric material compensates for component dimensional variations, the elastomeric material must be compressible such that the size of the compressed elastomeric material substantially coincides with the component dimensional variation within the cell.

The compressibility range of the compression pad is dependent upon its hardness. If the elastomeric material has a shore A durometer hardness of about 100, it is basically solid and incompressible and therefore not capable of compensating for the component dimensional variations. In contrast, if the elastomeric material has a shore A durometer hardness less than about 50, it is soft and incapable of maintaining uniform contact pressure and preventing movement of the electrolyte. Therefore, elastomeric material including rubbers such as silicon, fluorosilicon rubber, nitrile rubbers, and polyurethane, and other materials having a shore A durometer hardness of about 70 to about 95 are suitable elastomeric materials, with those having a durometer hardness of about 80 to about 90 preferred for pressures up to about 3,000 psig, and especially preferred for pressures of about 500 psig to about 2,000 psig. One such rubber is silicone rubber which has a durometer hardness of about 80, produced by General Electric Company, Waterford, N.Y. Other rubber materials such as urethane and fluorosilicones can be utilized. It would be noted that the hardness of the elastomeric material can be decreased with the use of expansion pathways (discussed below), and therefore the use of elastomeric material having a shore A durometer hardness above about 100 is feasible.

For the present application, in addition to possessing the desirable hardness, the elastomeric material should also be capable of maintaining its uncompressed length while in the compressed state. In other words, when pressure is applied across the cell, to the compression pad, via the production of hydrogen and oxygen at different pressures, the pad is compressed. This compression causes the elastomeric material width to decrease and its length, therefore, to increase or expand. Hereinafter this direction of expansion is referred to as lateral. Since, in the present application, the compression pad is used within a cell stack, which has rigid external walls, the overall length of the elastomeric material cannot increase. Consequently, compensation for this expansion must be incorporated into the elastomeric material itself. Compensation can comprise the use of pathways through the elastomeric material having sufficient volume to consume the laterally expanded elastomeric material, thereby allowing the compression pad to maintain its uncompressed length while in the compressed state. The pathways can be of varying geometries, and should be substantially evenly distributed throughout the elastomeric material, sufficiently large and abundant such that the elastomeric material can be compressed to a size substantially commensurate with the component dimensional variation, and preferably be located parallel to the width of the compression pad. If these pathways are not substantially uniformly distributed throughout the elastomeric material, the elastomeric material may not be capable of substantially uniform compression. Consequently, uniform contact pressure over the active areas of the electrodes may not be maintained.

Since the number of pathways is dependent on the hardness of the elastomeric material, the number of pathways should be commensurate with the number of pathways necessary to compensate for the lateral expansion and to attain the desired compression, without significantly effecting the compression pad's ability to maintain uniform contact pressure over the active areas of the electrodes and sufficient contact pressure to prevent movement of the electrolyte. For a cell operating at pressures between about 1,000 psig and about 2,000 psig, for example, about 6 pathways/in$^2$ (pathways per square inch) to about 25 pathways/in$^2$ having a diameter of about 0.100 inches to about 0.200 inches can be utilized in a compression pad, with about 8 pathways/in$^2$ to about 20 pathways/in$^2$ having a diameter of about 0.115 inches to about 0.140 inches preferred. Other conventional means which allow lateral expansion while retaining sufficient contact pressure can be employed.

The expansion phenomenon is illustrated in FIGS. 4 and 5. Where the elastomeric material 13 is deformed and forced laterally, the direction perpendicular to the width of the compression pad, into expansion pathways 17 upon compression. Consequently, both the size of expansion pathways 17 (see FIG. 4, expansion pathways 17 and FIG. 5, expansion pathways 17') and the thickness of the elastomeric material 13 decreases. The expansion pathways 17 allow the deformation of the elastomeric material 13 when the compression pad 11 is compressed.

If the compression pad is to be utilized in a bi-polar electrolysis cell stack where the cells are stacked and connected electrically in series without external leads, the elastomeric material must also be electrically conductive. Typically, a conductive substance having an electrical resistance below about 0.01 ohms·cm and preferably about 0.006 ohms·cm or lower, can be employed to impart electrical conductivity to the elastomeric material. If the conductive substance's electrical resistivity is greater than about 0.1 ohm·cm the efficiency of the cell will be reduced such that the bi-polar arrangement is impractical.

Generally, the conductive substance is a mixture of a conductive powder such as carbon or metal powder and an elastomeric binder. The conductive powder possesses particle-to-particle contact through the elastomeric binder such that during operation, electrical conductivity through the conductive substance is ensured. Sufficient elastomeric binder is utilized to provide structural integrity and elasticity to the conductive powder while allowing particle-to-particle contact of the powder through the elastomeric binder. Possible powders include silver, copper, silver plated copper, and other conventional powders such as various carbons and other metals having similar low electrical resistance, while possible elastomeric binders include rubber such as silicon and fluorosilicon rubber, and other elastomers having sufficient strength and temperature stability to be compatible with the cell environment. A conductive substance which has proven particularly useful with the present invention is silver filled silicon rubber having an electrical resistance of about 0.004 ohm-cm to about 0.005 ohm-cm, produced by Chomerics, Inc., Woburn, Mass.

In order to establish the conductive path through the elastomeric material, the conductive substance should be substantially evenly distributed throughout the elastomeric material in a second plurality of pathways (hereinafter referred to as electrical pathways). As with the expansion pathways, the electrical pathways are located parallel to the width of the compression pad, and the number, size, and geometry of these pathways are adjusted empirically to achieve the optimum combination of mechanical and electrical properties which correspond to sufficient elasticity to compensate for component dimensional variations and minimal electrical resistance.

Since the conductive substance is typically more rigid than the elastomeric material the amount and size of the electrical pathways are dependent upon the desired rigidity of the elastomeric material versus the desired conductivity. As the amount of electrical pathways increase, the elastomeric material stiffness similarly increases, thereby decreasing the compression capabilities of the compression pad. If a greater number of electrical pathways is desired, additional expansion pathways can be employed to sufficiently decrease the elastic strain of the elastomeric material, thereby compensating for the increased stiffness imparted by the conductive substance. In an about 30 in$^2$ to about 36 in$^2$ compression pad employed in a cell which operates at pressures of about 1,000 psig to about 2,000 psig, about 1 electrical pathway/in$^2$ to about 8 electrical pathways/in$^2$ having a diameter of about 0.130 inches to about 0.180 inches have proven useful, with about 4 electrical pathways/in$^2$ to about 8 electrical pathways/in$^2$ preferred, and about 5 electrical pathways/in$^2$ to about 6 electrical pathways/in$^2$ especially preferred.

The conductive substance in the electrical pathways should possess sufficient thickness to provide a conductive path from one cell, through the conductive substance, to the next cell of a stack, when the compression pad is in the compressed state while also being sufficiently less thick than the elastomeric material such that the conductive substance does not inhibit the necessary compression of the elastomeric material to compensate for the component dimensional variation. The preferred thickness of the conductive substance can readily be determined from the thickness of the elastomeric material and the elastic strain thereof at the desired operating pressure. The conductive substance should be substantially the same thickness as the elastomeric material in the compressed state.

Referring to FIGS. 4 and 5, the conductive substance 15 is located in electrical pathways 23 in the elastomeric material 13 with expansion pathways 17. Once elastomeric material 13 is compressed, the conductive substance 15 has substantially the same thickness as the compressed, expanded elastomeric material 13'.

Upon compression, in addition to expanding laterally, the elastomeric material often releases processing oil. This oil, which is typically released at pressures exceeding about 1,000 psig, interferes with the inter-cell conductive path through the compression pad by forming an oil film on the elastomeric material across the conductive substance. The oil film increases the electrical resistance between the conductive substance and the cell components directly in contact therewith. Consequently, a non-conductive barrier forms between the elastomeric material and the cell components. Therefore, since use of the compression pad in a bi-polar cell stack requires maintenance of the conductive path across the elastomeric material, the conductive path must be re-established.

One method of re-establishing the conductive path comprises removing the oil by locating an electrically conductive oil adsorbent sheet between the cell components and the elastomeric material. This oil adsorption sheet adsorbs the oil released by the elastomeric material, thereby decreasing the resistance between the conductive substance and the cell components.

The oil adsorbent sheet is preferably capable of wicking the oil from the surface of the elastomeric material. Consequently, electrically conductive oil adsorbent sheets having porosities sufficient to wick the oil released by the elastomeric material can be employed. Porosities of about 40% and about 60% have proven useful for reducing resistivity while porosities of about 45% to about 55% in combination with a sintered oil adsorbent sheet surface is preferred and porosities of about 50% are especially preferred to substantially eliminate the electrical resistivity caused by the oil. Possible oil adsorbent sheets include sheets of copper, nickel, stainless steel, carbon, and alloys and mixtures thereof, and others, with an about 0.01 inch to about 0.02 inch thick sheet of copper, nickel, or alloy thereof preferred.

Figure 3:
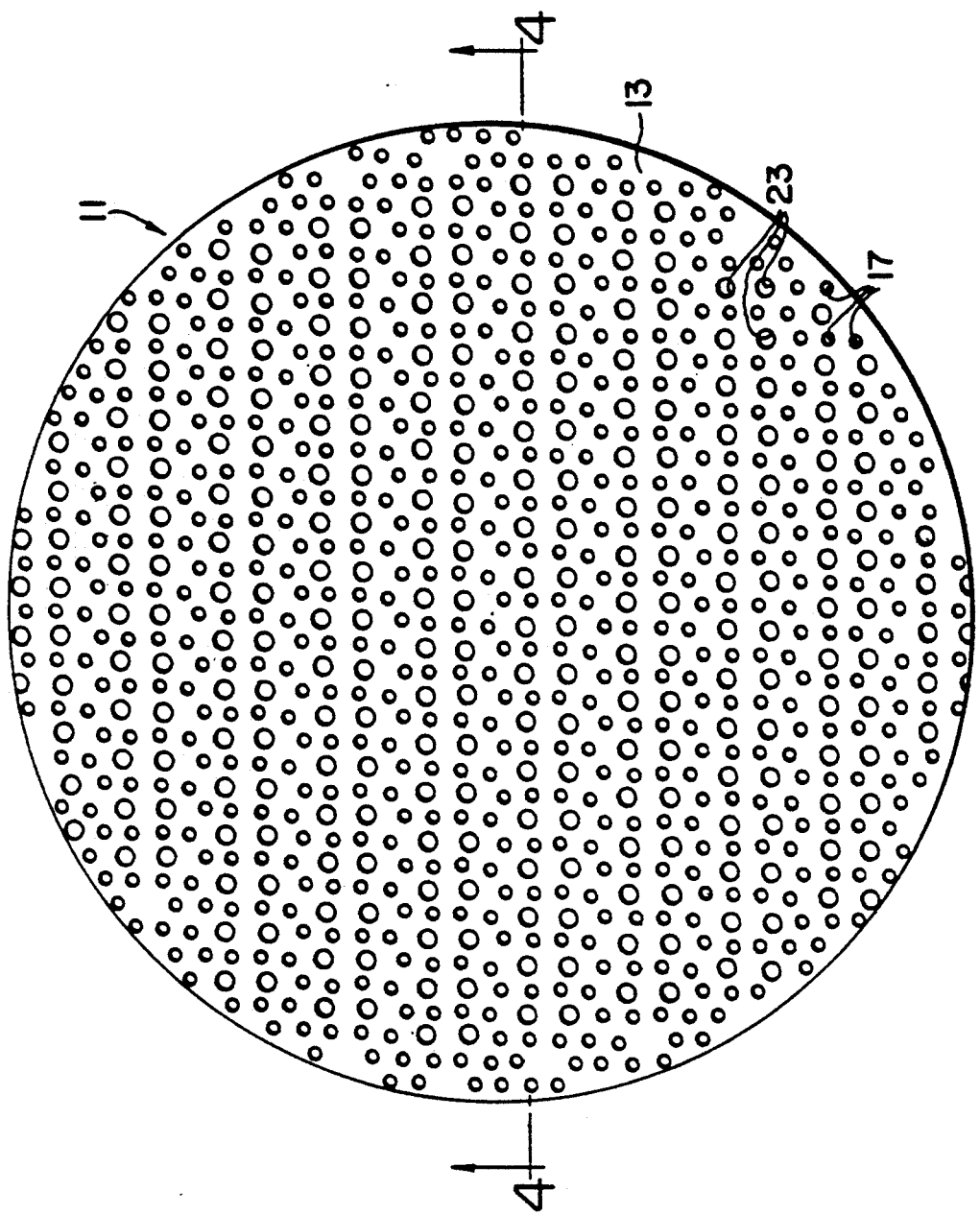
FIG. 3 is an embodiment of the elastomeric compression pad of the present invention.

FIG. 3 illustrates the compression pad of the present invention without the conductive substance 15 or oil adsorbent sheets. This compression pad 11 has electrical and expansion pathways 23 and 17, respectively. FIGS. 4 and 5, show cross-sectional views of the compression pad 11 of FIG. 3, in an uncompressed and a compressed state, respectively.

The uncompressed compression pad 11 clearly shows the elastomeric material 13 having expansion pathways 17 located parallel to the width of the elastomeric material. The elastomeric material width is the distance from the oil adsorbent sheet 19 to the oil adsorbent sheet 21, while the length is the dimension parallel to the oil adsorbent sheets 19 and 21. This compression pad 11 similarly has electrical pathways 23 with conductive substance 15. Once the compression pad 11 has been compressed, the conductive substance 15 contacts the oil adsorbent sheets 19 and 21 thereby occupying substantially all of the electrical pathways' volume, while the compressed elastomeric material 13' occupied part or all of the expansion pathways' volume 17'.

The present invention will be clarified with reference to the following illustrative example. The example is given to illustrate the use of the compression pad of the present invention. It is not, however, meant to limit the generally broad scope of the present invention.

EXAMPLE

The following procedure was used to determine the compressibility and the conductivity, over time, of the compression pad of the present invention.

1. A compression pad having two 0.0085 inch thick titanium oil adsorbent sheets surrounding a 0.056 inch thick silicone elastomeric material with 136 silver filled silicone electrical pathways and 408 expansion pathways distributed throughout the (6.5 inch diameter) elastomeric material.
2. The compression pad was loaded between two plates to form an assembly and a pressure of 1850 psig was applied to the assembly causing the pad to compress to about 0.033 inches.
3. The conductivity of the assembly was continuously monitored.
4. The thickness of the compression pad once the plates had been removed was 0.043 inches.

The resistance through the compression pad did not change over an eight day period and the compression pad continued to show elastic behavior. Unlike the prior art which was limited to pressure differentials of about 200 psig, the present compression pad operated flawlessly in an actual cell for 3576 hours at 1850 psig with no sign of degradation.

Figure 6:
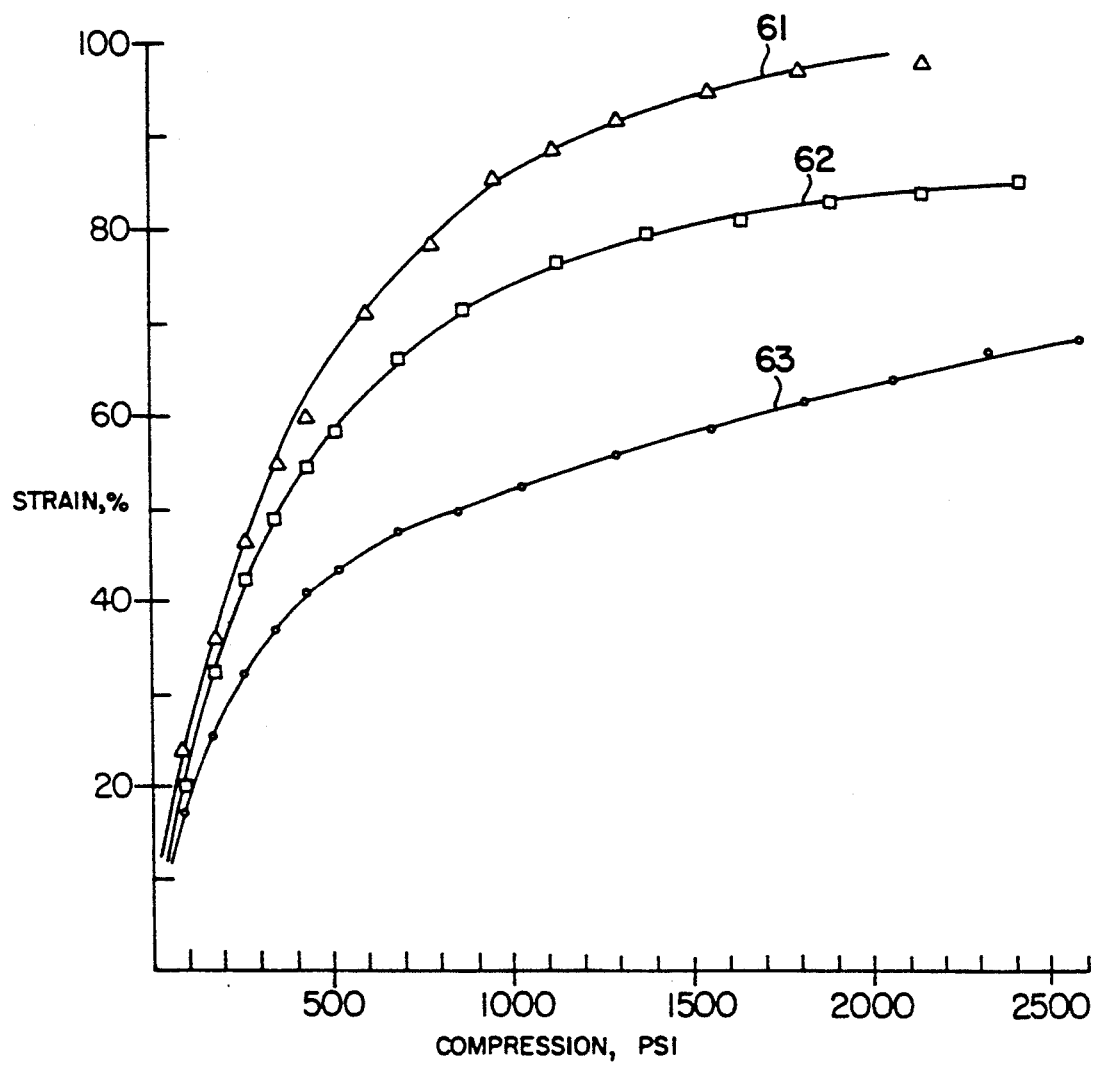
FIG. 6 is a graph of both the strain of the prior art elastomeric compression pad and the elastomeric compression pad of the present invention at given pressures.

Referring to FIG. 6, compression pads utilized in cell stacks preferably possess elastic strains of about 30% to about 70%. Below about 30% the strain is almost equal to normal component tolerances while above about 70%, the compression pad has been compressed to a point where it becomes substantially inflexible. Therefore, elastic strain percentages of about 35% to about 65% are preferred, with about 40% to about 60% especially preferred for the present compression pad.

A prior art compression pad having metal strips (shown in FIG. 2), attains an elastic strain above 60% at a pressure of about 400 psig and an elastic strain exceeding about 70% below 600 psig pressure (line 61). A prior art non-conductive compression pad (line 62) maintains an elastic strain below about 60% in pressures up to about 600 psig and below about 70% in pressures up to about 900 psig. However, this compression pad is non-conductive and therefore not useful for the bi-polar cell stack nor for pressure differentials greater than about 900 psig. Finally, the conductive compression pad of the present invention which is useful up to pressures of about 3,000 psig maintains an elastic strain below about 60% up to pressures of about 1,800 psig and an elastic strain below 65% up to pressures of about 2,500 psig.

It should be noted that the present invention can be utilized in other devices where the elimination of dimensional variations is similarly desired.

Although the present invention has been shown and described with respect to detailed embodiments thereof, it will be understood by those skilled in the art that various changes in form and detail thereof may be made without departing from the spirit and scope of the claimed invention.

We claim:

1. An elastomeric compression pad for compensating for component dimensional variations, which comprises: an elastomeric material having
   a. an overall uncompressed length,
   b. a width,
   c. a plurality of expansion pathways located across the width of said elastomeric material, wherein said expansion pathways have sufficient volume to allow said elastomeric material to substantially maintain its overall uncompressed length while in a compressed state, and
   d. a plurality of electrical pathways containing a sufficient amount of conductive substance to form an electrically conductive path across said width of said elastomeric material while in a compressed state, said conductive substance not forming an electrically conductive path across the width of said elastomeric material while said elastomeric material is in an uncompressed state, where the shore A durometer hardness of said elastomeric material is greater than about 50, the electrical resistivity of said conductive substance is less than about 0.1 ohm cm, and the elastic strain of said compression pad is less than 70% up to pressures of 3,000 psig.

2. An elastomeric compression pad as in claim 1, wherein said conductive substance has an electrical resistance below about 0.01 ohm·cm.

3. An elastomeric compression pad as in claim 1, wherein said conductive substance is a mixture of a conductive powder and an elastomeric binder.

4. An elastomeric compression pad as in claim 3, wherein said conductive material is a silver powder, copper powder, carbon powder, silver plated copper powder, or mixture thereof which has particle to particle contact through said elastomeric binder.

5. An elastomeric compression pad as in claim 1 having an elastic strain between about 50% and about 70% up to pressures of about 3,000 psig.

6. An elastomeric compression pad as in claim 1 further comprising at least one electrically conductive oil adsorption sheet located adjacent to said elastomeric material, perpendicular to said width.

7. An elastomeric compression pad as in claim 6, wherein said oil adsorbent sheet is a porous sheet of copper, nickel, or an alloy thereof.

8. An improved cell having an anode electrode, a cathode electrode, and an electrolyte disposed therebetween, wherein the improvement comprises an elastomeric compression pad for compensating for component dimensional variations up to pressures of about 3,000 psig, said compression pad having: an elastomeric material having
   a. an overall length,
   b. a width,
   c. a plurality of expansion pathways located across the width of said elastomeric material, wherein said expansion pathways have sufficient volume to allow said elastomeric material to substantially maintain its overall uncompressed length while in a compressed state, and
   d. a plurality of electrical pathways containing a sufficient amount of conductive substance to form an electrically conductive path across said width of said elastomeric material while in a compressed state, said conductive substance not forming an electrically conductive path across the width of said elastomeric material while said elastomeric material is in an uncompressed state, wherein the shore A durometer hardness of said elastomeric material is greater than about 50, the electrical resistivity of said conductive substance is less than about 0.1 ohm cm, and the elastic strain of said compression pad is less than 70% up to pressures of 3,000 psig.

9. An elastomeric compression pad as in claim 8, wherein said conductive substance is a mixture of a conductive powder and an elastomeric binder.

10. An elastomeric compression pad as in claim 9, wherein said conductive material is a silver plated powder, copper powder, carbon powder, silver plated copper powder, or mixture thereof which has particle to particle contact through said elastomeric binder.

11. An elastomeric compression pad as in claim 8 having an elastic strain between about 50% and about 70% up to pressure of about 3,000 psig.

12. An elastomeric compression pad as in claim 8 further comprising at least one electrically conductive oil adsorption sheet located adjacent to said elastomeric material, perpendicular to said width.

13. An elastomeric compression pad as in claim 12, wherein said oil absorbent sheet is a porous sheet of copper, nickel, or an alloy thereof.

14. An improved cell as in claim 8, wherein said conductive substance has an electrical resistance below about 0.01 ohm·cm.

* * * * *